Oct. 31, 1950 F. M. CARROLL ET AL 2,528,421

LEDGER SHEET HANDLING DEVICE

Filed Dec. 29, 1945 10 Sheets-Sheet 1

INVENTORS
F. M. Carroll
J. J. Bakelaar
BY W. B. Pond

W. M. Wilson
ATTORNEY

INVENTORS
F. M. Carroll
J. H. Bakelaar
BY W. B. Pond
W. M. Wilson
ATTORNEY

Oct. 31, 1950 F. M. CARROLL ET AL 2,528,421

LEDGER SHEET HANDLING DEVICE

Filed Dec. 29, 1945 10 Sheets-Sheet 3

INVENTORS
F. M. Carroll
J. H. Bakelaar
W. B. Pond
BY
W. M. Wilson
ATTORNEY

Oct. 31, 1950 F. M. CARROLL ET AL 2,528,421

LEDGER SHEET HANDLING DEVICE

Filed Dec. 29, 1945 10 Sheets-Sheet 4

INVENTORS
F. M. Carroll
J. H. Bakelaar
W. A. Pond
BY
W M Wilson
ATTORNEY

Oct. 31, 1950 F. M. CARROLL ET AL 2,528,421

LEDGER SHEET HANDLING DEVICE

Filed Dec. 29, 1945 10 Sheets-Sheet 5

INVENTORS
F. M. Carroll
J. H. Bakelaar
W. B. Pond
BY
W. M. Wilson
ATTORNEY

Oct. 31, 1950 F. M. CARROLL ET AL 2,528,421

LEDGER SHEET HANDLING DEVICE

Filed Dec. 29, 1945 10 Sheets-Sheet 6

INVENTORS
F. M. Carroll
BY J. W. Bakelaar
W. B. Pond
W. M. Wilson
ATTORNEY

Oct. 31, 1950 F. M. CARROLL ET AL 2,528,421

LEDGER SHEET HANDLING DEVICE

Filed Dec. 29, 1945 10 Sheets-Sheet 7

INVENTORS
F. M. Carroll
E. K. Bakelaar
W. B. Pond
BY
W. M. Wilson
ATTORNEY

LEDGER SHEET HANDLING DEVICE

Filed Dec. 29, 1945 10 Sheets-Sheet 8

INVENTORS
F. M. Carroll
J. J. Ochsner
BY W. B. Pond
W. M. Wilson
ATTORNEY

INVENTORS
F. M. Carroll
J. H. Bickelman
W. B. Pond
BY
W. M. Wilson
ATTORNEY

Oct. 31, 1950 F. M. CARROLL ET AL 2,528,421

LEDGER SHEET HANDLING DEVICE

Filed Dec. 29, 1945 10 Sheets-Sheet 10

INVENTORS
F. M. Carroll
J. J. Bakelaar
W. B. Pond
BY
W. M. Wilson
ATTORNEY

Patented Oct. 31, 1950

2,528,421

UNITED STATES PATENT OFFICE 2,528,421

LEDGER SHEET HANDLING DEVICE

Fred M. Carroll and John H. Bakelaar, Binghamton, N. Y., and William B. Pond, Arcadia, Calif., assignors to International Business Machines Corporation, New York, N. Y., a corporation of New York Original application May 3, 1941, Serial No. 391,732. Divided and this application December 29, 1945, Serial No. 638,344

2 Claims. (Cl. 271—11)

This application is a division of our copending application Serial No. 391,732, filed May 3, 1941 which has matured into Patent No. 2,442,970, June 8, 1948.

This invention relates generally to paper feeding devices and more particularly to machines of the class in which perforated record cards control the preparation of ledger sheets.

The main object of the invention is to provide a posting mechanism for tabulating machines or other office appliances in which provision is made for feeding classified ledger sheets past a printing station and stopping certain of the sheets in posting positions for receiving items of data of the same account or classification. The invention is illustrated as applied to a tabulating machine of the kind disclosed in Patent 1,976,617 in which the usual perforated record cards are fed through the machine and the perforated data thereon analyzed and used to control the operation of accumulating and printing mechanism. Ledger sheets perforated to represent classification data are fed through the posting mechanism concurrently with the feeding of record cards through the tabulating machine. The data of the cards is compared with the classification data on the sheets and, if they are in agreement, posting takes place on the first blank line beneath previously printed lines, all recording being performed under control of the perforations in the record cards. The ledger sheet is provided with a plurality of lines in which item printing is to be effective, and along the margin of the sheet a perforation is cut to represent the entry made on the corresponding printing line. Feed stopping controls are provided to sense the number of marginal perforations to determine on which line of the ledger sheet the next entry is to be made. The field of classification data and the marginal area allotted for the feed control perforations are arranged symmetrically on the sheet, so that after one side is filled with items the sheet may be turned over to receive a like number of items on the other side.

Another object of the invention is the provision of improved sheet separating and feeding devices. The purpose of these devices is to lift the upper sheet off the pile in the magazine and advance it into the bite of the first set of feed rollers. An edge of the upper sheet is bent by a suction cup after which a separator blade is inserted below the lifted edge, while a pushing shoulder engages the lifted edge to direct the sheet toward the feed rollers.

Another object of the invention is the provision of aligning devices for cooperating with the sides of the ledger sheet to insure that it enters the classification sensing devices with the perforations aligned with respect to the sensing brushes. A double set of sheet sensing brushes are provided in order that a sheet may be handled with either face uppermost. The two sets of brushes are arranged symmetrically with respect to the area on the record material containing the perforations, so that the sheet may be reversed in position to receive printing impressions on either surface and at the same time have one or the other of the sensing devices analyze the perforation area appearing in either of two positions.

Another object of the invention is the provision of a vertically gliding magazine with a sheet receiving tray mounted in a cantilever fashion leaving one side open for manipulation of the tray and ready access to the sheets thereon. Associated with the magazine tray is a positioning device for locking the tray when it is depressed to receive additional record material. The tray becomes free to return to a sheet feeding position only after being depressed a second time to the fullest extent.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view showing both sides of a ledger sheet relating to account 055 07 0258. It may be noted that the sheet is perforated with feed control perforations in both side margins and that the one marginal edge is filled with feed control perforations. This is an indication that the sheet has been used to receive printing impressions on both sides, the number of impressions on the second side being indicated by the number of marginal perforations in the right margin as viewed from the rear.

Figure 7:
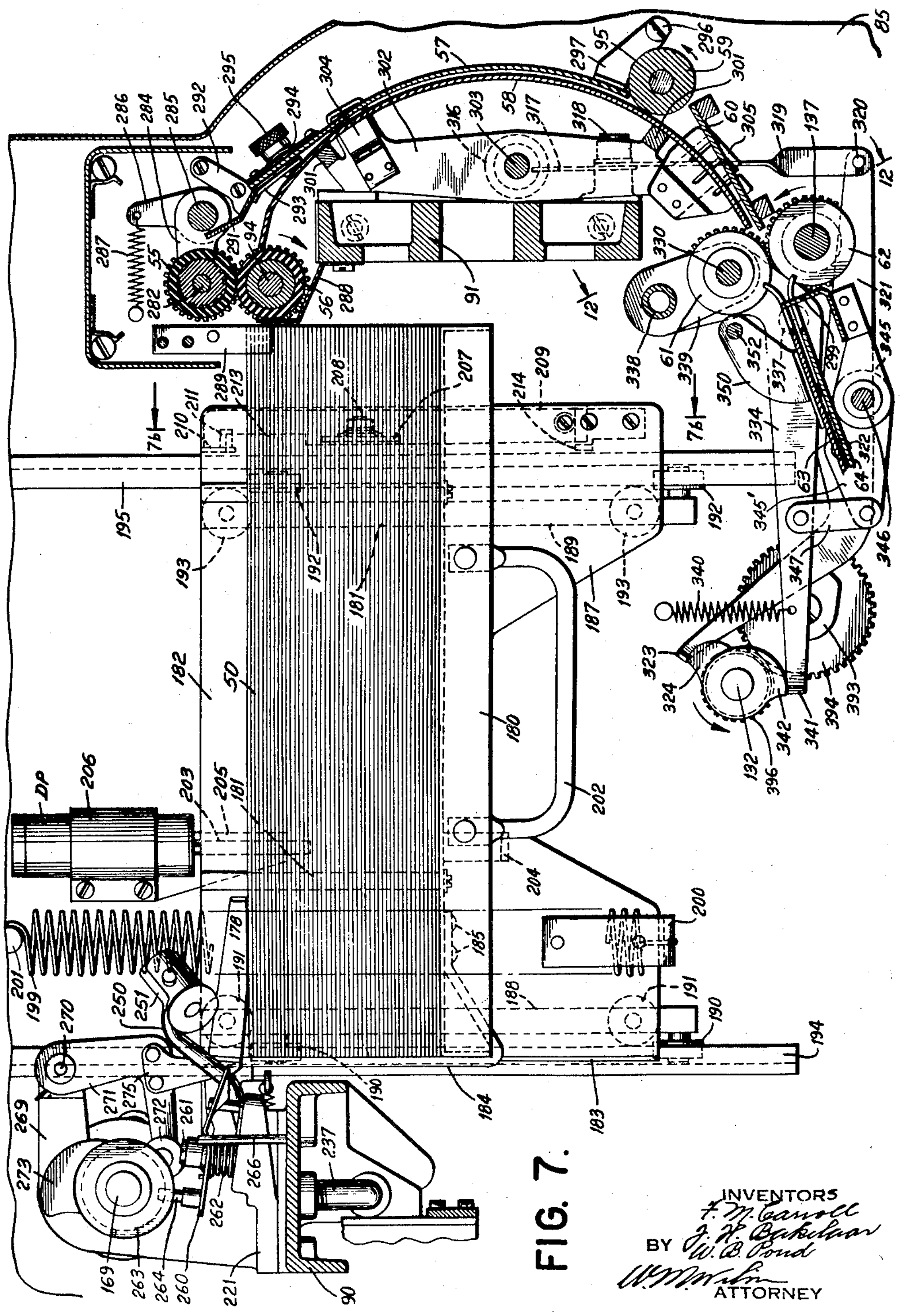
Figures 7A, 7B:
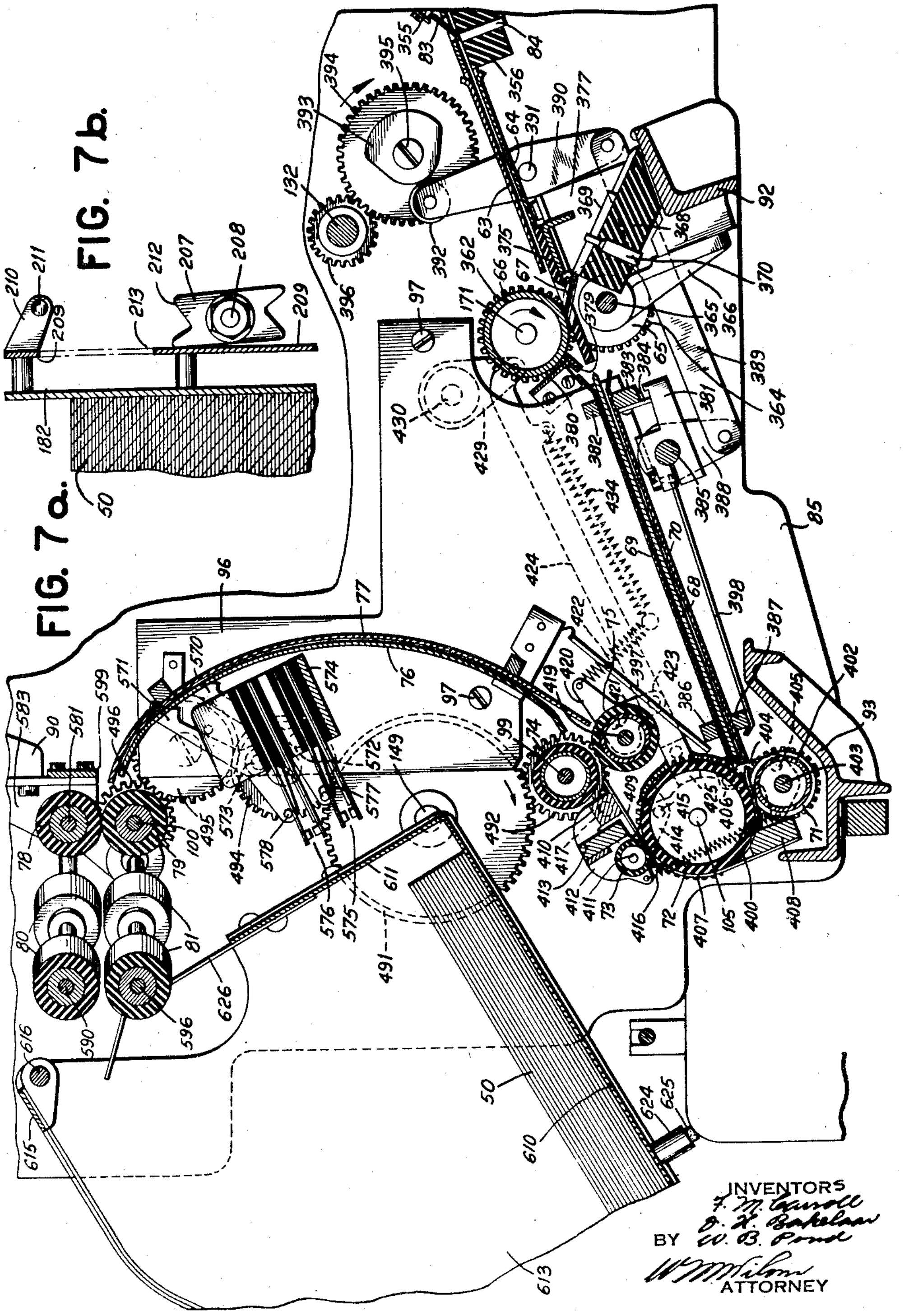

Figs. 7 and 7a when taken together illustrate a cross-section of the guides and feed rollers arranged along the path of the sheets to guide them and control their movement from the magazine to the stacker.

Fig. 7b is a detail view of a section taken along line 7b—7b in Fig. 7 and showing the locking device cooperating with the magazine tray.

Figure 8:
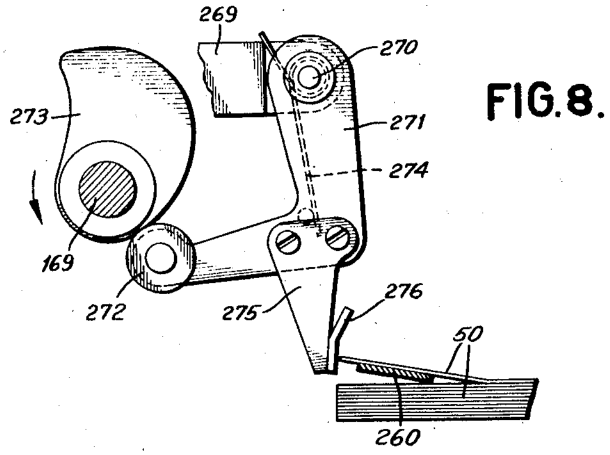

Fig. 8 is a detail view of the sheet pushing device for advancing the upper sheet into the bite of the first set of feed rollers.

Figures 9, 10:
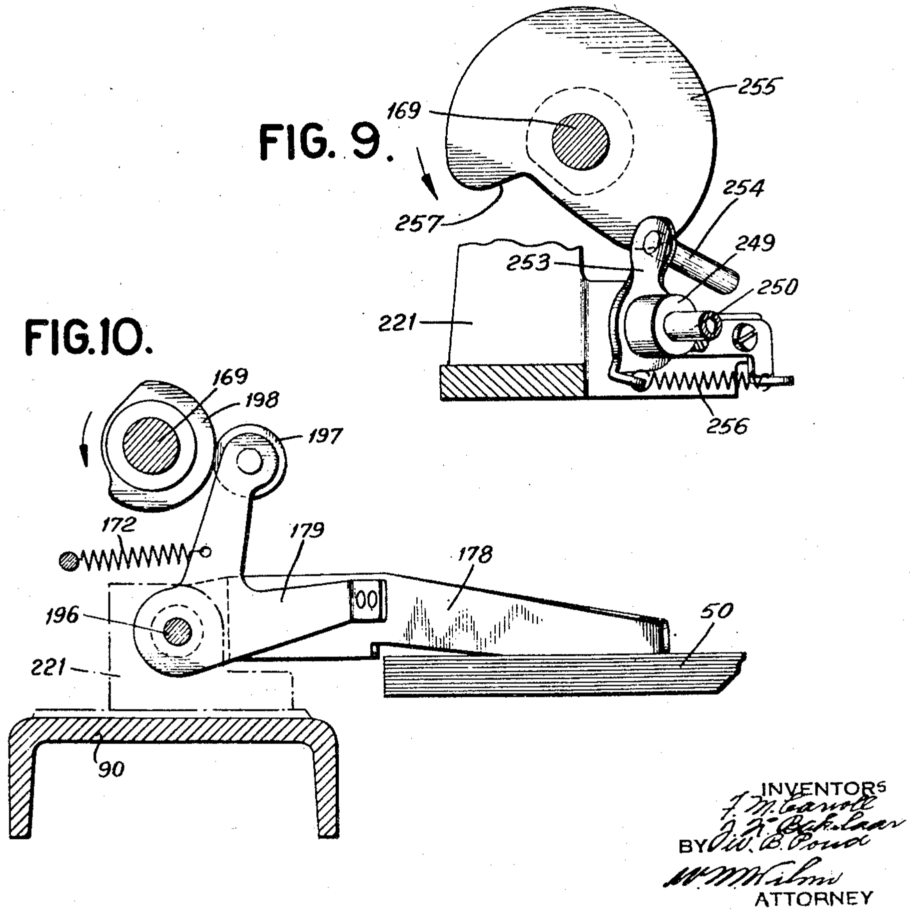

Fig. 9 shows the cam and associated controls for operating the suction devices which serve to lift the corner of the top sheet.

Fig. 10 is a detail view of the sheet depressing member used to hold the sheets down in the magazine while the corner of the upper sheet is lifted.

Figure 11:
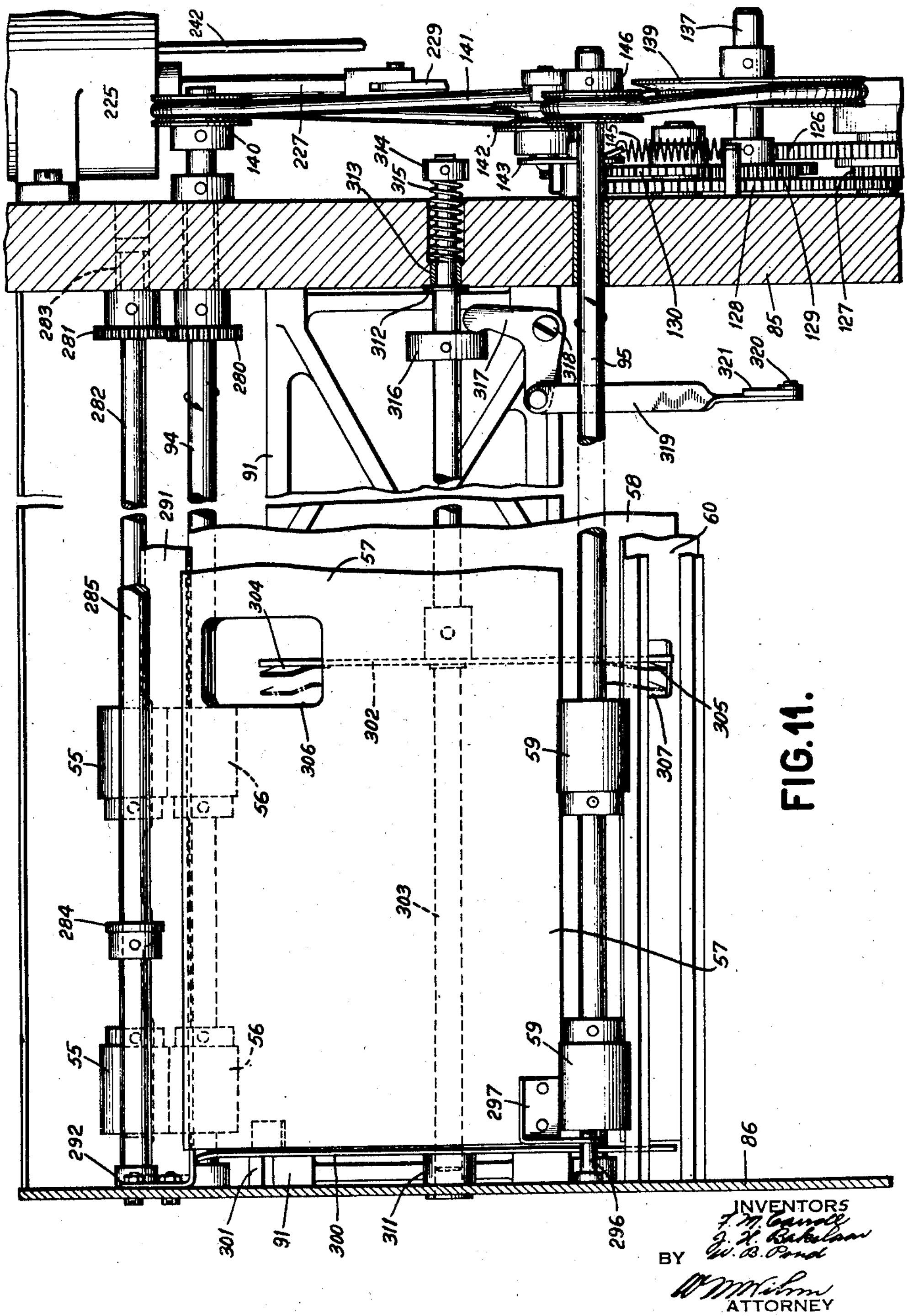

Fig. 11 is a rear elevation view partly in section showing the sheet aligning devices and the drive connections to the sheet feeding rollers.

Figure 12:
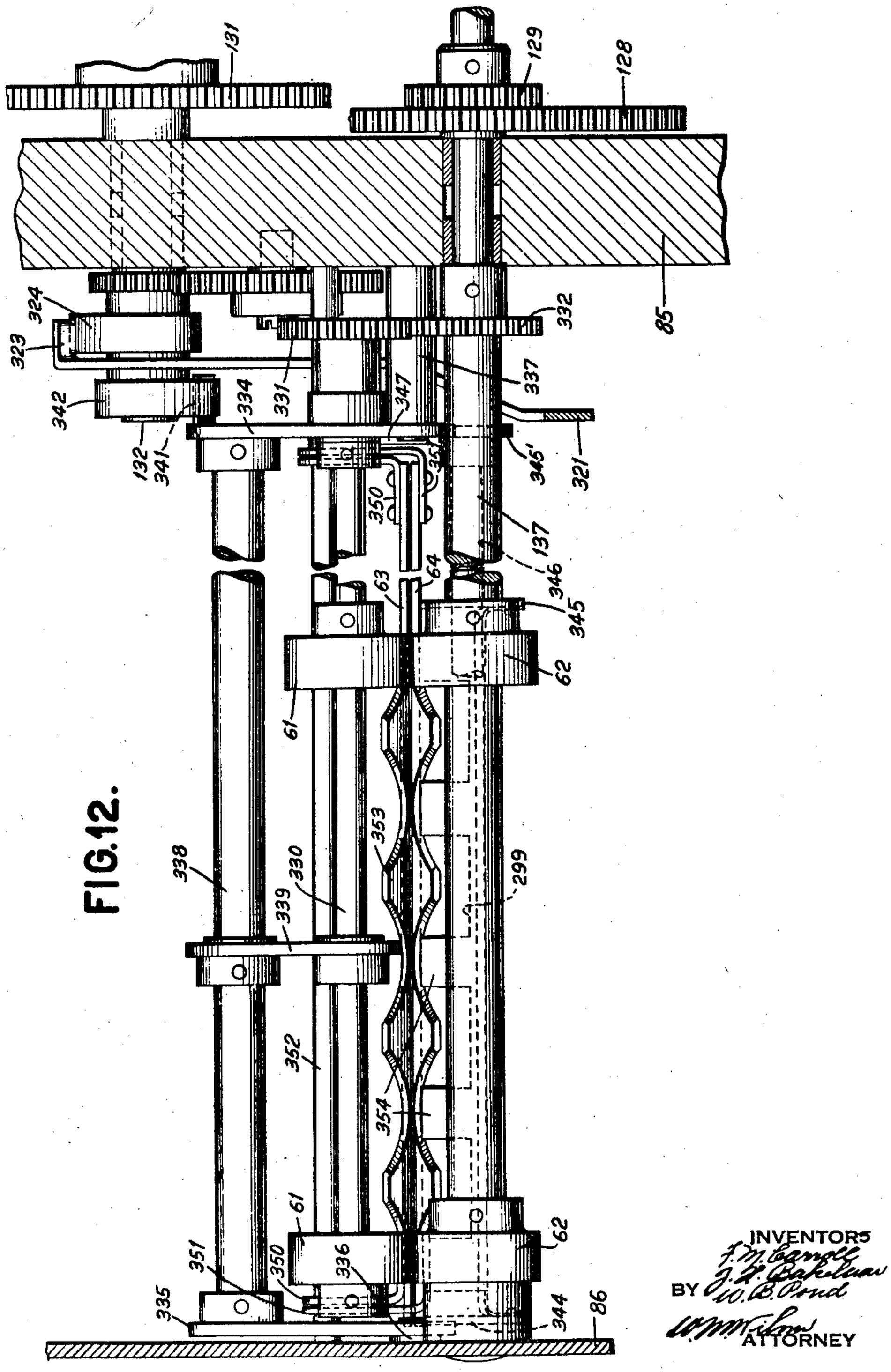

Fig. 12 is a rear elevation view partly in section taken along the lines 12—12 in Fig. 7 and showing the intermediate set of sheet feeding rollers. This view also shows the sheet gate or stop for limiting the initial movement of each sheet as it is drawn out of the magazine.

The devices of the present invention are shown in the disclosed embodiment as a ledger sheet feeding mechanism cooperating with a tabulating machine generally of the kind revealed in the U. S. Patent 1,976,617. The machine is adapted to sense the data on perforated record cards and add and print a record thereof. The cards are arranged in groups according to a group number perforated therein, and the machine may be set for listing to print a record of the data on each item card of a group, or for tabulating to print only a record of the total amount of a group. A stack of ledger sheets related to the groups of cards is placed in the magazine of the sheet feeding mechanism. The group numbers on the cards correspond with similar ledger numbers perforated in the ledger sheets to identify an account. The tabulating machine, through the group control devices, exercises control over the operation of the ledger posting sheet feeding devices. A group number comparing unit is also provided between the cards and sheets to insure that the items from a group of cards are printed on the related sheet. While operating in listing, it is desirable to eject the ledger sheet when the end of a related group of cards is reached. Then, too, it is well to determine which account is represented on the next group of cards to be sensed, so that the proper ledger sheet can be advanced to the print receiving position. Both of these controls are exercised over the posting devices by the tabulating machine which initiates the ejection of a ledger sheet, sets up numeral sectors to indicate and compare the group number of the cards about to be sensed, and controls the rapid passage of unselected sheets past the printer without operation until the related sheet arrives and stops automatically in the proper posting position.

The ledger posting devices in turn exercise control over the operation of the tabulator. The starting of the tabulator is automatically delayed until after the high speed sheet feeding and line spacing operations have ceased. When the comparing unit finds a sheet out of order, the machine is stopped so that the operator may put it in proper place in the pile of sheets. The machine is stopped automatically when either of two other conditions prevail, i. e. when there is an overflow of items on a sheet, and when a full sheet is not followed by another sheet of the same account with room for additional items. Other controls and interlocks between the tabulator and the sheet posting devices are described hereinafter.

Figure 1:
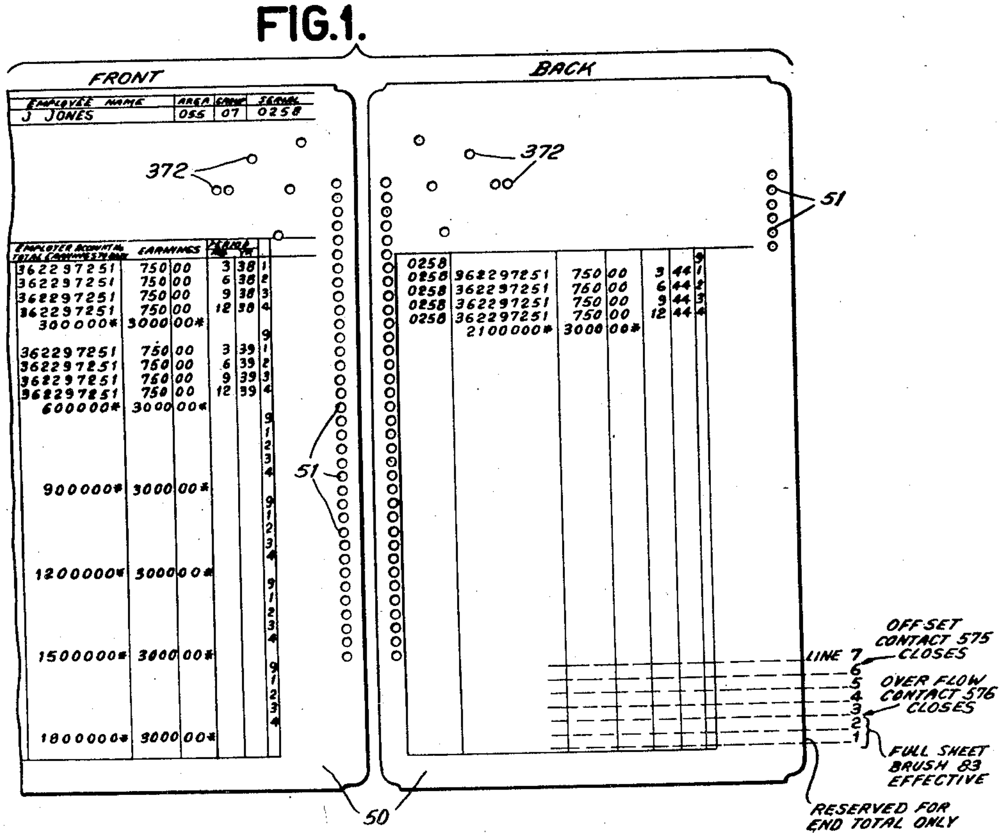
Figure 2:
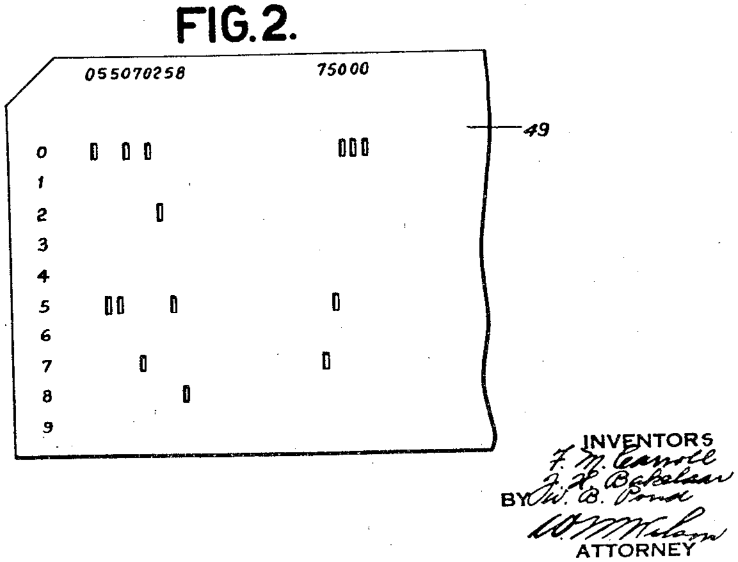
Fig. 2 is a view showing one of the record cards relating to the same account. The amount represented on the card is to be printed on the sheet shown in Fig. 1.

The main purpose of the feeding devices is to select and move a ledger sheet 50 (Fig. 1) to the correct printing position as rapidly as possible. If the ledger sheet already contains six lines of print, then when it is reinserted it is to be fed to the seventh line. A perforation 51 is punched in the margin of the sheet for each line of print, and it is through such perforations that electrical control of sheet feeding and positioning is established.

The sample sheet shown is one that has been filled on one face. After being turned over, six lines are already used to record the summary entry, four items and the total resulting from the addition of the quarterly items.

As illustrated in connection with the posting of Social Security payments, there are usually four quarterly payments represented by four item cards to be posted. In addition to the four item cards, the card group includes a summary card which includes all amounts previously paid into the account. The summary card leads the cards of the account group, and the spaces shown on sheet 50, Fig. 1, between the item groups are representative of the operation wherein the old balance on the summary card is entered into an accumulator before the items are added thereto. After the four items are added to the old balance and an account group change is detected, a total taking cycle is initiated to print the sub and grand total amounts and at the same time the grand total is punched in a new card in the summary punch, said new summary card later being grouped with new item cards and the grand total thereon then becoming the old balance amount. The operation of punching a summary card while totals are printed is set forth in detail in Patent 2,126,595.

*Path followed by the ledger sheet*

Figure 3:
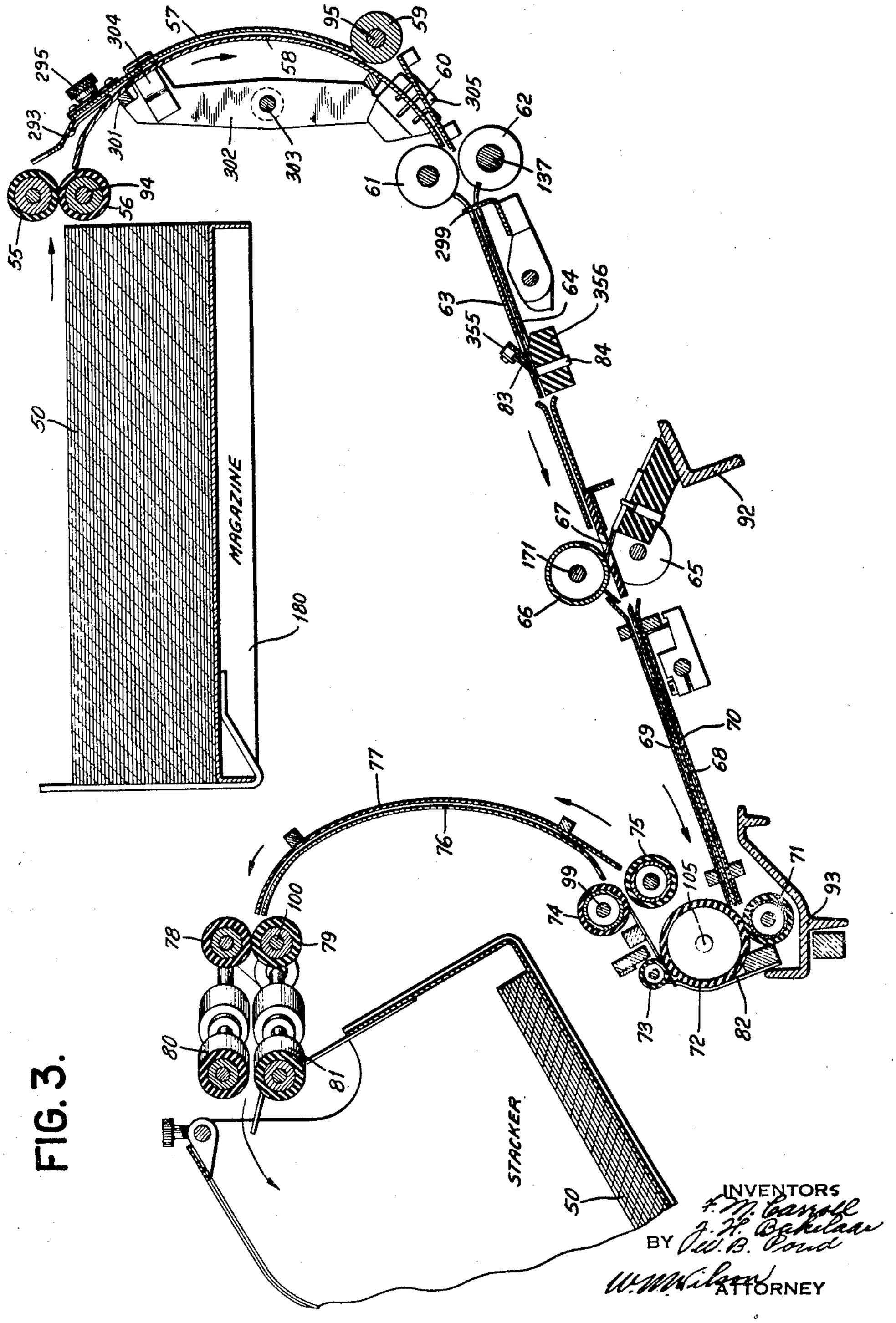
Fig. 3 is a diagrammatic side elevation view showing the path taken by the ledger sheets in moving from the magazine, past the platen and into the stacker.

In the diagrammatic view, Fig. 3, is shown the path followed by the ledger sheet 50 in going from the magazine to the stacker. The top sheet is pushed to the right into engagement with the first set of feed rollers 55 and 56 and is then curved downward and toward the front by a pair of guides 57 and 58. An auxiliary roller 59 and a flat guide 60 direct the sheet into a second pair of rollers 61 and 62. After leaving the second set of feed rollers, the sheet continues forward and downward in a straight path between guides 63 and 64. It is sensed by a brush 83 and contact 84 to detect the presence of a full sheet. The sheet is next drawn between feed rollers 65 and a contact roller 66 cooperating with two sets of sensing brushes 67 for reading the account number perforations in the sheet. Advancing further, the sheet passes along one of two alternate paths defined by a separation plate 68 and two outer guides 69 and 70. As the sheet passes around the front of a platen 72, it is held thereon by curved guide wires 82 and pressure rollers 71 and 73. In going upward, the sheet is elevated by ejection feed rollers 74 and 75 and rearward movement is reversed by curved guides 76 and 77 which direct the sheet between ejecting rollers 78 and 79 and other selectively effective offsetting ejection rollers 80 and 81 which throw the sheet into the stacker box.

During normal printing operation, three sheets are in the course of advancement from the magazine to the stacker. The first sheet is around the front of the platen 72 where it is pinched by rollers 71 and 73, ejection rollers 74, 75 being normally open. The position of the first sheet is dependent on the number of previously recorded lines, said sheet standing with the top blank line at the printing position.

The second sheet is under the contact roller 66 with the top of the sheet (the part carrying the account number perforations) already past the rollers and near the platen. One side of the double channel 69, 70 contains the tail of the first sheet which is overlapped by the top of the second sheet in the other side of the channel. When the card groups change, the constantly rotating rollers 74, 75 are closed to eject the first sheet, and at the same time rollers 71 and 73 are lifted to allow the top of the second sheet to thread its way around the platen 72 as driven by feed rollers 65 and 66.

The third sheet normally rests with its front edge against a gate or stop 299 and the rollers 61 and 62 are open.

When a sheet feeding operation is initiated, four sheets are advanced along the path shown in Fig. 3; the first sheet is ejected, the second sheet is advanced around the platen, rollers 61, 62 close to move the third sheet under sensing brushes 67, and the fourth sheet is picked off the top of the pile in the magazine and pushed into the bite of rollers 55, 56.

*Framework*

Figure 4:
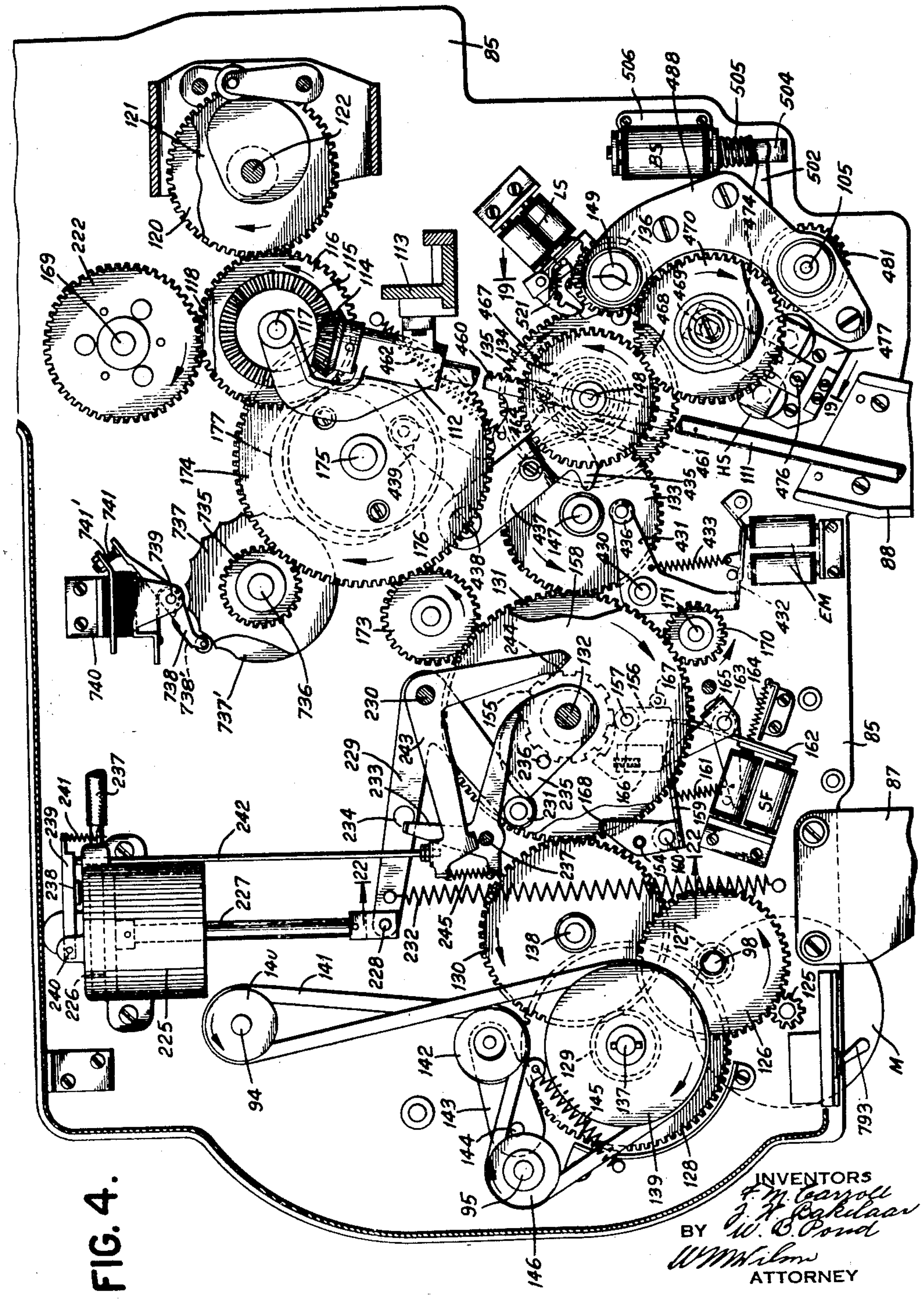
Fig. 4 is a side elevation view partly in section taken along line 4—4— in Fig. 6 and disclosing the driving connections of the feeding devices and the drive connection from the tabulator listing control shaft.
Figure 5:
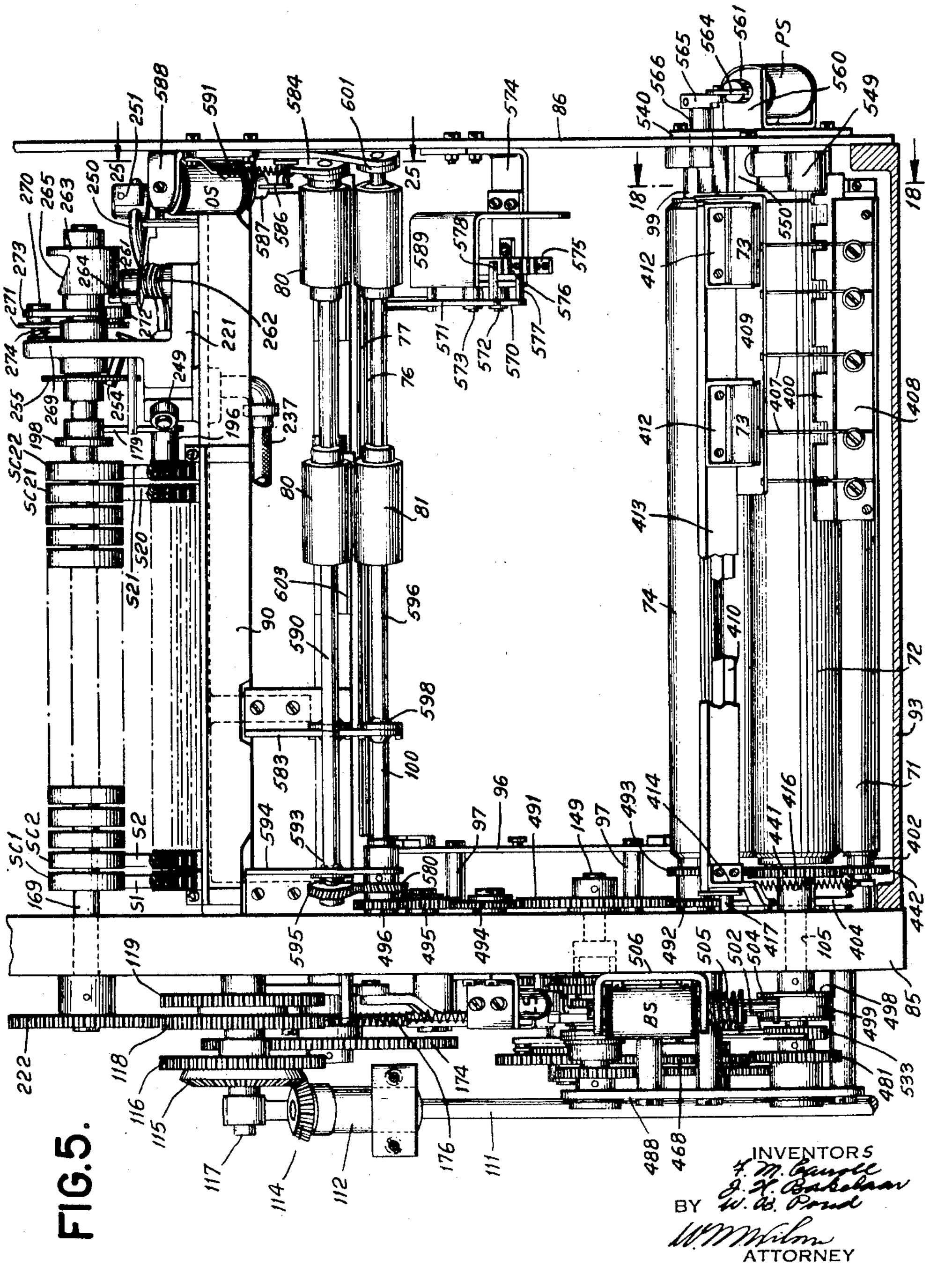
Fig. 5 is a front elevation view partly in section taken along line 5—5 in Fig. 6 and showing part of the sheet feeding devices and the printing platen.
Figure 6:
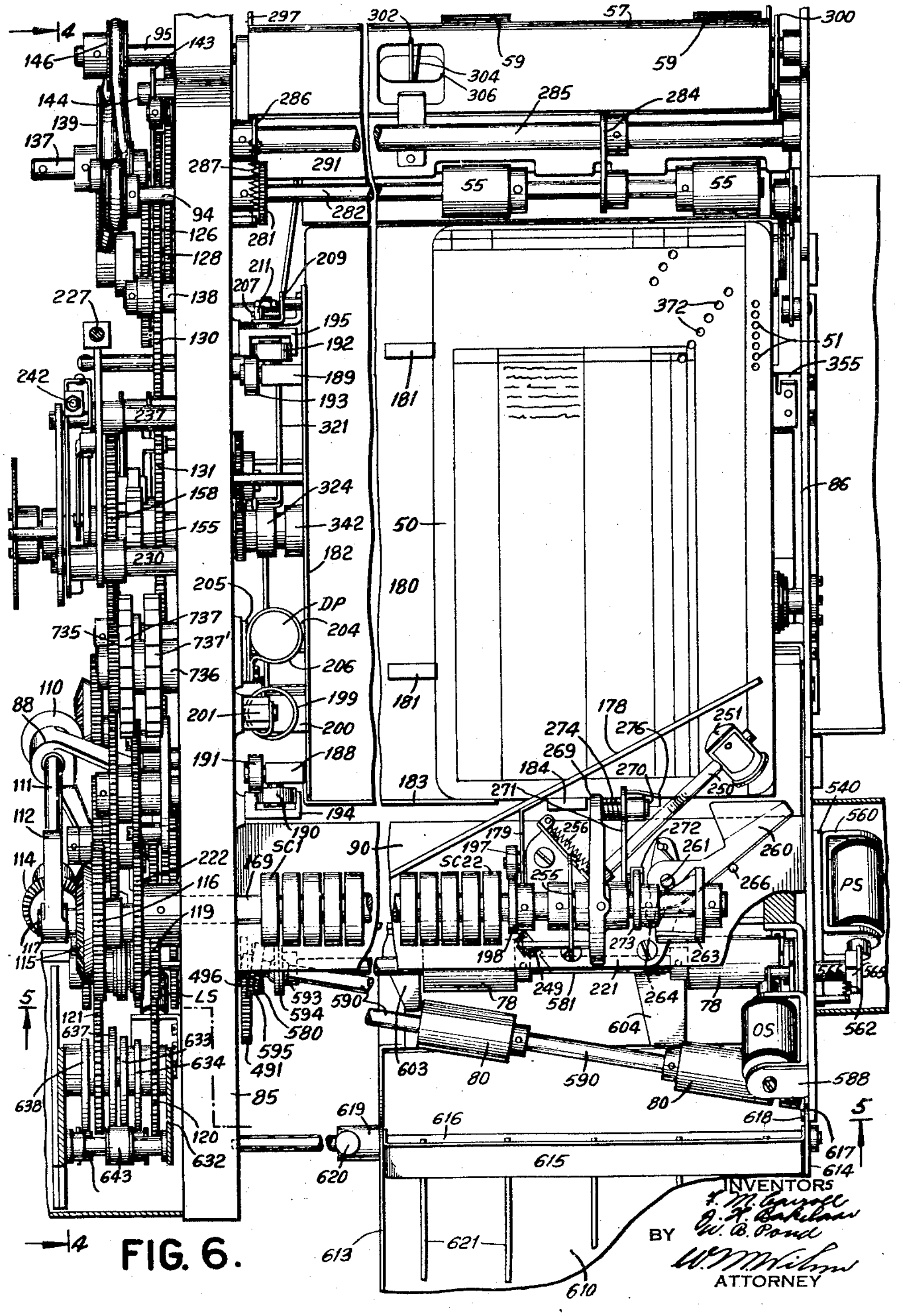
Fig. 6 is a plan view showing a sheet magazine and the devices for advancing the sheets into the print receiving position.

The framework of the feeding devices comprises the thick rigid left side frame 85, Figs. 4, 5 and 6, and a thinner U-shaped right side frame 86. The left frame, Fig. 4, is fastened to the tabulator by a pair of brackets 87 and 88, while other connections fasten the right frame to the machine.

A number of strong castings 90, 91, 92 and 93, Figs. 7 and 7*a*, are fastened between the side frames to brace them and provide supports for various mechanisms. Also fixed between the side frames are quite a number of rectangular bars for supporting the sheet guides. The feed rollers with fixed positions are on shafts rotating in bearings formed on the side frames. Rollers 56, 59, 62, 74 and 79, Figs. 7 and 7*a*, are attached to shafts 94, 95, 137, 99 and 100, respectively, rotating in, and projecting through the left side frame 85. A platen shaft 105 inside part of platen 72 also projects through the left side frame.

An intermediate frame 96, Figs. 5 and 7*a*, is spaced from side frame 85 by screw studs 97 to support ejection guides 76, 77 and provide space for the feed roller gearing on the inside of frame 85.

*The main driving mechanism*

Two sources of driving power are used to operate the various sheet feeding control devices; the one is the motor M, Fig. 4, and the other is the list shaft of the tabulator, which shaft operates whenever cards are fed and analyzed.

One side of the comparing unit is set up to represent card account numbers, and it is this side that is set up and restored by connections from the tabulator.

Attached to list shaft of the tabulator is gearing for driving the lower end of a drive transmitting shaft 111 that is rotatably supported by the bracket 88, Fig. 6, and at the upper end, Fig. 4, shaft 111 rotates in a bearing bracket 112 fastened to an extension 113 on the left frame 85. Attached to the upper end of shaft 111 is a bevel gear 114 in mesh with a similar gear 115 fastened to a spur gear 116 rotatable on a stub shaft 117. An upwardly extending arm of bracket 112, Fig. 5, supports one end of shaft 117 and the other end rides in frame 85. Also on shaft 117 but independent of gear 116, Fig. 5, are two gears 118 and 119 coupled together, loosely mounted, and driven by connections from motor M as explained hereinafter.

Turning now to the drive connections from motor M, Fig. 4, it is seen that the motor shaft carries a driving pinion 125 which meshes with gear 126 of a speed reduction train comprising pinion 127, gear 128, pinion 129 and idler gear 130. Gear 126 and pinion 127 are fastened together and pivoted on a stud 98.

The other feed roller shafts 94 and 95 are driven by a belt drive. Referring to Figs. 4 and 11, it is seen that gear 128 and pinion 129 are fastened together and attached to shaft 137 which carries feed rollers 62, Fig. 7, and also carries a drive pulley 139. An endless belt 141, Fig. 4, is drawn around pulley 139 and passed over a small pulley 140 secured to shaft 94. The belt is then passed under an idling tension roller 142 before passing around another pulley 146 secured to shaft 95. Tension roller 142 is pivoted on an arm 143 fulcrumed at 144 on the side frame. A spring 145 tends to rock the arm in a clockwise direction to take up the slack in the belt 141. By means of the connections traced, shaft 94 is rotated in a counterclockwise direction, Fig. 4, and shafts 95 and 137 are rotated in a clockwise direction to operate the feed rollers near the back of the feeding device, so that any sheet pushed out of the magazine is advanced downwardly and forward toward the platen.

A train of drive gearing extends across the machine in a horizontal line to reach the drive connections for the line spacing, head spacing, high speed feed and ejecting mechanisms. It is already explained that gear 130 is driven by the speed reduction gearing connected to the motor. This gear is loosely pivoted on a stud 138 projecting from the side frame. It meshes with another gear 131 loosely mounted on a shaft 132. Gear 131 meshes with another idler gear 133 pivoted on a stud 147 secured to the left side frame 85. The idler meshes with a pinion 134 secured to another gear 135 which is loosely pivoted on a fixed rod 148 extending from the side frame. Gear 135 meshes with a pinion 136 attached to the line space clutch ratchet secured to the shaft 149.

*Sheet feed clutch and drive connections*

Shaft 132, Fig. 4, controls the suction devices for lifting the top sheet out of the magazine, and this same shaft is part of the sheet feed clutch for operating gate 299, Fig. 3, and closing feed rollers 61, 62.

Attached to the large drive gear 131, Fig. 4, is a clutch ratchet 155 loosely mounted on shaft 132. Cooperating with the ratchet is a clutch pawl 156 pivoted at 157 on the side of another large gear 158 fixed to shaft 132 and of the same diameter as gear 131. The pawl 156 is normally held out of engagement by a disengaging member 159 pivoted on a stud 160 on the side frame.

Member 159 is limited in its movement by a stop pin 154 projecting from the side frame and through a hole in a projection 168 formed on the member. A spring 161 attached to the member 159 urges it in a clockwise direction and tends to release the pawl. However, the rotation of the member is obstructed by the upper end of an armature lever 162 pivoted on a stud 163 extending from the side frame. Attached to the armature lever is a spring 164 tending to rock it in a counterclockwise direction to latch member 159 in a restored position. Whenever a sheet feeding operation is selected, a magnet SF is energized to attract armature lever 162 and rock it in a clockwise direction to release member 159 which in turn releases pawl 156 so that the clutch is engaged and gear 158 is connected to the drive gearing from the motor for one complete revolution.

In order to prevent backward movement of the gear 158 when it is stopped at the end of a cycle of operation, there is pivoted on stud 163 a stop bail 165 with an arm extending under a block 166 attached to gear 158 for the added purpose of carrying a compression spring cooperating with the clutch pawl. Another arm of stop bail 165 is attached to one end of spring 161 and cooperates with a stop pin to limit the movement of the stop member.

Soon after pawl 156 is tripped and the gear 158 starts to rotate in a clockwise direction, block 166 on the gear cooperates with the projection 168 on the latching member 159, so that it is rocked about pivot 160 and restored to an effective position over armature lever 162 and ready to disengage the pawl when gear 158 reaches the home position.

Cooperating with gear 158 are gear connections leading to various mechanisms made effective whenever sheet feeding is selected. Meshing with gear 158 is a gear 170 attached to a shaft 171, Fig. 7*a*, carrying the contact roller 66 with which the sheet analyzing brushes 67 cooperate to sense the account number perforations of the sheet.

Another gear 173 meshes with gear 158 and acts as an idler in transmitting motion to a large gear 174 attached to a shaft 175 rotating in the side frame 85. Shaft 175 also carries a smaller gear 176 and a cam 177 attached to gear 174 to rotate in unison therewith. Gears 158 and 174 are of the same diameter, so that each cycle of operation of the former causes a similar operation of the latter. Gear 176 meshes with gear 118, described hereinbefore as loosely pivoted on the shaft 117, and provides a drive connection to gear 119 which is attached to gear 118 and in mesh with the gear 120 cooperating with the number setting devices on the sheet side of the comparing unit.

Cam 177 is the operating means for a train of connections extending to the platen for operating it to adjust the sheet through a head spacing movement to lead the top of the sheet around the platen, after which the high speed and line space mechanisms adjust the sheet in the accurate posting position.

*The sheet magazine*

In Figs. 6 and 7, it is seen that the sheet magazine is supplied with sheets 50 through a large centralized opening O in the right side frame. The magazine comprises a large tray which is movable up and down, so that the operator can pull it down to place a pile of ledger sheets thereon and then allow it to move upward again until the top sheet is in the sheet feeding position.

The sheet tray, Fig. 6, is composed of a base 180 with settable edge lugs 181, a left side wall 182, and a short front wall 183. It is proportioned to handle sheets of various widths. In the plan view it is apparent that the right side of the tray is without any wall, thus giving ready access for the removal and insertion of sheets through the opening in the right side frame. The rear edge of the tray is also without an upper wall because it is over this edge that the top ends of the sheets 50 are pushed into engagement with the feed rollers 55, 56. A flexible front gage is provided in the form of a removable L-shaped bar 184, Fig. 7, in contact with the flange on the front of the base 180 and secured at 185 to the under side of the base. In Fig. 7 it is seen that the left side wall 182 extends below the base and provides front and rear ends 186 and 187 to which various magazine controls are attached.

Attached to left wall 182 (Fig. 6) are two long roller holding bars 188 and 189 of rectangular cross section. Pivoted on bar 188 (Fig. 7) are a pair of rollers 190 and another pair of rollers 191 mounted at right angles to the first pair. On bar 189 there are also pivoted two pairs of angularly disposed rollers 192 and 193. A pair of long channels 194 and 195 are secured to frame 85 in vertical spaced alignment to act as tracks with which the rollers cooperate to make the tray readily movable upward as the top sheets are fed therefrom. From the showing in Figs. 6 and 7, it is clear that the pairs of rollers 190 and 192 cooperate with inner walls of channels 194 and 195, while the other pairs of rollers 191 and 193 contact with the edges of the channels. Thus, the magazine tray is held in a true horizontal plane in all positions and yet readily responsive to vertical adjustment.

A large spring 199 is attached to one end to an extension 200 on the bottom wall 186 and at the other end the spring is held by a fixed stud 201 on the frame 85. The spring tends to raise the tray and bring the top sheets into feeding position regardless of the number of sheets or the thickness of the pile on the tray.

A handle 202 (Fig. 7) is attached to the flange of the tray base 180, so that the tray can be pulled down against the tension of spring 199 when it is desired to insert sheets into the magazine.

A shock absorber or dash pot DP is provided to cushion the upward return of the tray should it slip out of the operator's grasp when it is drawn down. A downwardly extending plunger 203 of the dash pot is in the path of a lug 204 fastened to the base 180 of the tray. An extending plate 205 is offset and perforated to guide the lower end of plunger 203. A strap 206, Fig. 6, is wrapped around the dash pot, and screws pass therethrough and through plat 205 into the frame 85 to hold the body of the device fixed with respect to the tray.

The magazine is provided with stopping and full stroking devices for controlling the movement of the sheet tray. It is desired that when the tray is pulled down initially, it be held there until filled and then be pulled down again before being released to move upward a differential extent according to the number of sheets on the tray. The part for locking the tray down is the rotating cam latch 207 (Fig. 7*b*) which is pivoted on a stud 208 fastened to the side of the guide channel 195 (Fig. 7). Normally, one long side of latch 207 merely rubs against the side of an elongated strip 209, spaced from and fastened to the side wall 182 of the tray. However, the strip is bent at the top to form an extension 210 carrying a pin 211 which strikes a cam face 212 on the latch when the tray is first pulled down as far as possible. This camming action serves to turn the latch clockwise (Fig. 7b) so that its lower end projects into an opening or notch 213 cut in the strip, thus preventing the tray from rising more than the short distance moved while the edge of the notch cooperates with the bottom face 212 to cam the latch further in a clockwise direction. The latch 207 then lies at such an angular position that when the tray is pulled down the second time, pin 211 strikes the side of the latch and rocks it further clockwise, out of locking engagement with the strip, thus freeing the tray for upward movement.

A lug 214 (Fig. 7) is attached to the right side 187 of the tray wall, and it is aligned to abut against stud 208 when the tray is allowed to move upward all the way. The shock of a sudden release is eased by a dash pot DP before the lug strikes the stud.

When released to move upward to a sheet feeding position, the tray moves to a position determined by the thickness of the pile of sheets on the tray. The tray is stopped with the top sheet 50 (Fig. 7) pressing against the under side of a long stop lever 178 pivoted on a rod 196 (Fig. 10) supported in the frame casting 90. In Fig. 6 it is seen that the lever extends at an angle across the lower right hand corner of the sheet, and it is braced in the middle by an operating bell crank 179 riveted thereto and fulcrumed on the same rod 196. Lever 178 and crank 179 together form a stopping bale which is held in the normal position by a spring 172. A roller 197 on bell crank 179 cooperates with a cam 198 on an operating shaft 169 to raise and lower lever 178. It is explained hereinafter how the lever is raised away from the sheets during sheet feeding when another means is brought into play to hold down all sheets except the top sheet.

Many control devices other than cam 198 are mounted on shaft 169. This shaft is supported at the right end by a large bearing standard 221 (Fig. 5) fastened to the top of frame 90, while the left end passes through side frame 85 and carries a gear 222 in mesh with gear 118. It is explained hereinbefore that gear 118 is driven by a train of gearing (Fig. 4) extending down to gear 158 which is rotated whenever a sheet feeding operation is selected by magnet SF. Gear 222 is equal in diameter to the drive gear 176 and therefore it is rotated through one complete revolution for each sheet feeding cycle.

*Sheet separating and picking devices*

The sheets are fed one by one from the top of the pile on the magazine tray. In order to separate the top sheet from the other sheets in the magazine, the corner of the sheet is engaged by a suction device and bent upward away from the other sheets. A separator blade passes under the raised sheet and holds down the pile while a sheet picker pushes the top sheet off the pile and into the feed rollers.

Suction for the sheet separator is provided by a suction pump shown in Fig. 4. There it is seen that a cylinder head 225 is fastened to the outside of side frame 85. Within the cylinder is a piston 226 connected to a piston rod 227, the lower end of which is articulated at 228 on an arm of a crank lever 229 pivoted on a stud 230 and provided with an operating roller 231. A spring 232 tends to rock lever 229 in a counterclockwise direction to pull down piston 226. However, the lever is held in a normal position by a latch lever 233, the upper end of which cooperates with a notch in a stud 234 attached to the side of lever 229. The operating lever 229 is restored to the home position by a cam 235 attached to the sheet feeding gear 158 and cooperating with roller 231 whenever a feeding operation is selected.

In the normal position of the parts, cam 235 holds the lever 229 in a raised position so that the latch 233 may fall under the shoulder on stud 234. At the beginning of a sheet feeding cycle, cam 235 moves clockwise away from roller 231 and allows lever 229 to depend on latch 233. After a short interval of time, a pin 236 on cam 235 strikes the lower arm of latch 233 which is pivoted on stud 237 extending from the side frame. When the latch is so operated and rocked in a counterclockwise direction, it is moved out of the path of stud 234 and lever 229 is free to be operated by a spring 232. The spring moves down the piston 236 and creates a partial vacuum in the top of the cylinder 225. In communication with the top of the piston is a tube 237 leading to suction devices for engaging the top sheet in the magazine. The condition of a partial vacuum is maintained above the piston and throughout the length of tubing 237 for a short interval of time, during which the top sheet is lifted and separated from the remaining sheets in the magazine.

Before the sheet is pushed out of the magazine it is desired that the vacuum condition be relieved to release the sheet. This is accomplished by opening an air port 238 leading into the top of the cylinder. The air inlet port is normally closed by a valve lever 239 pivoted at 240 on the top of the cylinder head. A spring 241 tends to hold the valve closed. Abutting against the under side of the valve lever is a rod 242 guided near the top by a hole in the lug on the side of the cylinder head, and at its bottom end the rod is adjustably connected to one end of a bell crank 243 pivoted on stud 230. The vertical arm of bell crank 243 is formed with an offset portion 244 in the path of pin 236. As pin 236 is moved with cam 235 in a clockwise direction, it first encounters latch 233 to release the parts for the creation of suction in the feeding devices, and then, continuing in the same direction and soon after passing out of engagement with latch 233, the pin strikes offset portion 244 and rocks bell crank 243 in a clockwise direction to lift rod 242 and valve lever 239, so that air is allowed to enter above the piston and throughout the tubing 237 to relieve the vacuum condition causing suction therein.

A spring 45 is connected between latch 233 and bell crank 243 to hold these parts in the normal positions and to restore them when they are operated. As cam 235 continues to rotate in a clockwise direction and as it nears the end of the cycle, it cooperates with roller 231 to move lever 229 in a clockwise direction to restore the piston to the normal position near the top of the cylinder head and latch stud 234 over lever 233. As the piston moves, the air above the piston is driven through the port 238 automatically to permit an easier movement of the parts.

In Figs. 5 and 7, it is seen that the line of suction tubing 237 is terminated underneath the frame member 90 directly under the standard 221 and an opening within the standard provides an air passage between tubing 237 and a hollow shaft 249 pivoted horizontally at an angle within the lower part of the standard. Extending rearwardly from the tubular shaft 249 (Fig. 6) is a smaller tube 250 which carries at its end a suction cup 251. In Fig. 7, it is seen that the lower part of the suction cup 251 is cut away with an opening that leads into the hollow tube 250, the end of which is filled to prevent leakage of air except through the cup. The cup is clamped on to tube 250 at an angle poised above the lower right hand corner of the sheet (Fig. 6). Tube 250 does not project in a straight line beyond the inside of the bearing tube 249 but is bent to form a crank (Figs. 5 and 7), so that when the shaft 249 is rocked in the standard 221 the cup is clamped down upon the end of the top sheet, and then upon the return twisting motion the crank lifts the cup into the position shown in Fig. 7.

The arrangement for raising the suction cup and lowering it is shown in detail in Fig. 9. There it is seen that an operating arm 253 is secured to the hollow shaft 249 and carries a projecting pin 254 in cooperation with a cam 255 which holds the cup in the normal raised position. A spring 256 urges the engagement of the cup and sheet. However, as soon as the feeding cycle is initiated and shaft 169 starts to rotate counterclockwise, a depression in cam 255 permits counterclockwise motion of arm 253 and the suction parts connected therewith, with the result that the suction cup is clamped down upon the corner of the top sheet. Since a vacuum condition is created in the tubing leading to the cylinder already described, the top sheet is attracted to the cup and moved along therewith when it is raised by the cam shoulder 257 on cam 255. The suction cup is held in the raised position through the remainder of the cycle, but the vacuum condition therein is terminated shortly after a sheet separator is operated to pass under the lifted corner of the top sheet.

In Fig. 6 is shown a plan view of the sheet separator blade 260 which is pivotally mounted on a screw 261 fastened in the standard 221. The blade is shaped with a pointed end bent downwardly above the pile of sheets 50 (Fig. 7) but normally out of alignment with the front edge of the sheet, therefore permitting the suction cup to lift the edge of the top sheet higher than the blade. However, as soon as the cup and attached sheet edge are lifted, blade 260 is released to snap under the single lifted sheet and press down the other sheets as seen in Fig. 8. A coil spring 262 (Fig. 7) is coiled around a hub on screw 261 and tends to push the blade towards the sheets. However, movement of the blade is normally obstructed by a face cam 263 (Fig. 6) secured to shaft 169. Cooperating with the face of cam 263 is a pin 264 extending vertically upward from a short arm on the end of the blade opposite the separating point. As the cam 263 moves in a counterclockwise direction (Fig. 7) the pin 264 is in contact with a concentric level part of the face of the cam (Fig. 6) so that during the early part of the feeding cycle, while the suction cup is moving, the blade remains stationary. However, after about 90° of movement, a sharp depression 265 (Fig. 5) comes opposite the pin 264 and frees the blade for operation by the spring 262. The blade 260 is snapped into the sheet separating position and remains there until near the end of the cycle when a rise on the face of cam 26, strikes pin 264 and rocks the blade back in a clockwise direction (Fig. 6) to the home position. Overthrow of the returning blade is prevented by a long pin 266 riveted in frame 90 and projecting alongside the blade. The pin also aids in holding the blade hooked while the cam is assembled.

After the top sheet 50 is lifted by the suction cup 251 and held separated by the blade 260, lever 178 (Fig. 10) is lifted by cam 198 to free the sheet for horizontal movement by a pushing device.

The sheet pushing device is shown in detail in Fig. 8 where it is noted that a vertical web 269 of the standard 221 (Fig. 7) projects rearward to provide a fulcrum 270 for an L-shaped lever 271 carrying a roller 272 cooperating with a cam 273 on shaft 169. A coil spring 274 is wound around fulcrum 270 and pressed against a pin on the lever to urge it clockwise and press the roller 272 against the cam. Fastened to the side of lever 271 is a downwardly extending arm 275 formed with an offset pusher or picker extension 276 bent to cooperate with the front edge of the lifted sheet. During the first part of the rotation of shaft 169, lever 271 remains idle as roller 272 rides over a concentric part of cam 273. However, as soon as the sheet lifting, separating and releasing operations are completed, a sudden rise on cam 273, strikes roller 272 and rocks the lever 271 in a counterclockwise direction, causing extension 276 to push against the edge of the top sheet 50 and shove it towards the rear of the machine, into the bite of the feed rollers 55 and 56 (Fig. 7). Lever 271 is allowed to restore slowly by following a smooth descending surface on cam 273.

*The first set of feed rollers*

Directly behind the rear edge of the top sheet 50 (Fig. 7), are mounted the cooperating feed rollers 55 and 56 which rotate continuously during machine operation. When the top sheet is pushed between the rollers, it is carried along toward the rear and down between guides 57 and 58. The clockwise rotating rollers 56 are fastened to the shaft 94 which is driven by belt 141 (Fig. 11), as explained hereinbefore. A pinion 280 fastened to shaft 94 meshes with another pinion 281 on a shaft 282 carrying the upper pair of feed rollers 55, thus providing a driving connection between the rollers. Shaft 282 is not mounted in fixed bearings in the side frames 85 and 86 as is shaft 94. Instead, it is loosely supported at the right end in a bearing 283, and its left end is flexibly supported by an arm 284 on a shaft 285 loosely mounted in the side frames. Also attached to shaft 285 (Fig. 7), is an arm 286 to which is connected a spring 287 pulling the shaft in a counterclockwise direction to press rollers 55 down upon rollers 56. Therefore, rollers 55 are free to rise when a sheet of substantial thickness is fed, but they are maintained in contact with rollers 56 at all other times by spring 287.

A shield 288 is fastened to frame 91 under rollers 56 and not only holds the rear edges of the sheets away from the rollers, but also pushes the sheets into alignment when the magazine is raised.

The sheets are aligned in the other direction by a guide strip 289 (Fig. 7), which is attached to the inside of right frame 86 and bent to cam the edges of the upper sheets into the proper position.

As the top edge of the sheet 50 appears behind the rollers 55, 56, it is directed downward by a deflector 291 with ears 292 attached to the side frames.

The top end of the outer guide 57 is attached to deflector 291 by a clamp comprising an inner holding block 293, a leaf spring 294 and a screw knob 295 for tightening the connection.

The lower end of guide 57 is pivotally fastened to studs 296 on the side frames by ears 297 projecting from the sides of the guide.

While the sheet is passing down between guides 57 and 58, it is urged downward by the counterclockwise rotation (Fig. 7), of rollers 59 on the shaft 95 which is belt driven as already explained. Rollers 59 do not press the sheet against guide 58 and feed it positively, but instead they merely contact the underside of the sheet and urge it downward. After the sheet has passed beyond the feed control of rollers 55, 56 and is loose within the guides 57, 58, rollers 59 urge it down against the sheet stop 299.

*The sheet aligner*

While the sheet is loose within the guides 57 and 58, it is aligned laterally before being engaged by the normally open rollers 61 and 62 and carried further into the machine. There are two side aligners for putting the sheet in the proper position before it is analyzed. The one aligner 300 (Fig. 11) is fixed in the machine directly adjacent the open ended left side of guides 57 and 58. It is secured to frame 91 and a pair of square bars 301 which also stiffen the inner guide 58.

The other aligner 302 is located near the center of the machine and attached to a rod 303 which is moved at the beginning and ending of each cycle. Attached to aligner 302 (Figs. 7 and 11) are upper and lower flexible fingers 304, 305 which project through openings 306 and 307 cut in guides 57 and 58. The fingers usually assume the dotted line position shown in Fig. 11. However, as soon as the sheet feeding cycle is started, aligner 302 is withdrawn to the full line position and remains there until the sheet is away from rollers 55 and 56 and loose within the guides 57 and 58. Then, near the end of the sheet feeding cycle, aligner 302 is pushed toward the left to locate the sheet as the flexible fingers 304, 305 push it against the stationary aligner 300.

The left end of aligner rod 303 (Fig. 11) is loosely mounted within a bearing 311 secured to the side frame 86. The other end of the rod is formed with a stop shoulder 312 and a reduced portion slidably mounted within a bearing 313 secured in a hole in the main side frame 85. Fastened to the end of the rod is a collar 314 which serves to confine a coil spring 315 that tends to hold the rod over toward the right at all times. Another collar 316 is fastened to the rod to form an operating projection cooperating with a bell crank 317 pivoted at 318 on a boss extending from frame 91. Articulated on the horizontal arm of the bell crank is a link 319 (Fig. 7) which is pivotally connected at 320 on an operating lever 321 fulcrumed at 322 on the main side frame. The operating lever is formed with an offset shoulder 323 cooperating with a cam 324 secured to the feed clutch shaft 132. Referring to Fig. 4, it will be noted that shaft 132 is connected to the sheet feeding driving gear 158, the operation of which is mentioned hereinbefore. Turning back to Fig. 7, it is seen that cam 324 normally assumes a position wherein lever 321 is rocked in a clockwise direction to pull down link 319 and rock bell crank 317 (Fig. 11) in a counterclockwise direction, pushing rod 303 toward the left against the pressure of spring 315. However, cam 324 is shaped so that early in each feeding cycle, lever 321 is released to rock in a counterclockwise direction, so that the aligner 302 assumes the full line position shown in Fig. 11, wherein it is out of the path of the incoming ledger sheet. Late in every feeding cycle, at the time the sheet is free from all feeding rollers, the cam 324 again comes into action to operate the lever and push the aligner toward the left to confine the sheet within the appointed lateral bounds.

*Sheet stop and feed roller engaging devices*

While the sheet is being aligned within the guides 57 and 58 (Fig. 7) it is located longitudinally by the end stop 299 in engagement with the front edge of the sheet. The movements of the sheet laterally and longitudinally into a correct position are made possible by the opening of a space between the feed rollers 61 and 62. The operation for separating the feed rollers is synchronized with the operation for putting the sheet stop in the path of the advancing sheet, because normally when the stop is in effect, the rollers are ineffective, and conversely, when the rollers are made effective, the stop is to be withdrawn.

The lower pair of feed rollers 62 (Fig. 12) are attached to the shaft 137 provided with fixed bearings in both side frames and having gear connections with the driving motor as revealed in Fig. 4. The other upper rollers 61 are fastened to a rod 330 (Fig. 12) which carries a gear 331 in mesh with another gear 332 attached to shaft 98, so that the rollers are in constant operation as long as the motor is energized. Rod 330 carrying the upper feed rollers is arranged to be moved as part of a bail suspending the upper rollers above the lower fixed rollers. The bail comprises a pair of side arms 334 and 335. Arm 335 is pivoted on a stud 336 secured to the left side frame 86 (Fig. 12), while the other arm 334 is fulcrumed on the end of a stud 337 attached to the inside frame 85. The two arms are connected by a tube 338 to which is attached the hub of a connecting bracer link 339 encircling rod 330 to stiffen it midway between feed rollers and also act as a carrying means to rock the feed rollers in and out of contact with rollers 62.

The one side arm 334 (Fig. 7) is extended toward the front of the machine and formed with an offset lug 341 cooperating with a cam 342 attached to shaft 132. The cam is proportioned so that it normally depresses arm 334 to open rollers 61, 62 and close gate 299. Early in the feeding cycle, the rise on cam 342 moves away from lug 341 and allows closure of the rollers for sheet feeding until it nears the end of a complete revolution. Then, the rise on the cam cooperates with lug 341 to push down the front end of side arm 334 and rock it in a counterclockwise direction about the pivot 337. This serves to lift the entire roller holding unit comprising rod 330 and rollers 61.

At the time that this separation is caused between rollers 61 and 62, the advancing edge of the incoming ledger sheet is approaching a position between the rollers. It is, therefore, advisable to provide means for stopping the front of the sheet, and such a means is provided in the form of the stop or gate 299. The stop forms a cross member of a bail including a pair of levers 344 and 345 (Fig. 12) and an operating lever 345' secured to a rod 346 supported between the side frames. The cross section of stop 299 is formed in the shape of an L with a series of vertical extensions movable into the path of the advancing sheet. The ends of the stop member are formed with overturned ears riveted to the side levers 344 and 345. A link 347 is connected between the lever 345' and the operating side arm 334. A spring 340 attached to arm 334 holds the arm rocked in a clockwise direction with lug 341 in constant cooperation with cam 342. As the end of the cycle approaches, the cam pushes down the end of the arm as already explained to separate the rollers, and at the same time link 347 is pushed down to rock the levers 344 and 345 in a counterclockwise direction to lift stop member 299 into the path of the advancing sheet. The parts are held in this position with the sheet aligned at the end of the cycle when sheet feeding is suspended.

Early in the next cycle of operation, cam 342 presents an abrupt depression which allows spring 340 to rock the operating arm 334 in a clockwise direction to lower feed roller 61 into contact with the ledger sheet and press it against the lower feed roller 62. At the same time, link 347 is pulled upward and the sheet stop is lowered out of the path of the sheet which is now properly aligned and ready to be directed forward by rollers 61 and 62 which continue to rotate.

The sheet guides 63 and 64 are supported on pairs of hinge hangers 350 and 351, Fig. 12, which encircle a rod 352. The rear edges of the guides are flared as at 353 to facilitate the entry of the sheet, and the edges are also scalloped to provide spaces for the upstanding projections 354 on the sheet stop 299. The lower ends of the guides 63 and 64 (Fig. 7*a*) are supported on studs extending from the top of brackets 377 fastened in the machine. These and other of the hinged guides give ready access to all parts of the sheet path for the removal of sheets should any jam occur.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for feeding record sheets, a vertically movable magazine tray holding a plurality of said sheets, means for guiding said tray, means for urging said tray upward, a stop member engaging the upper top sheet in the pile of sheets on the said tray, a suction cup poised above the corner of the top sheet on said pile, a vacuum pump, means for operating said pump, tubing connections between said pump and said suction cup, means for operating said cup to clamp it on the top sheet and lift the cup and the sheet, a sheet separator, means for inserting said separator between the lifted sheet and the remainder of the sheets in the pile, means for operating said stopping means to lift it away from the top sheet after the separator is in position to stop upward movement of all sheets except the top sheet, a sheet pusher cooperating with the sheet, and means for operating said pusher to push the top sheet out of the magazine after the sheet is lifted by the cup, separated by the separator and released by the lifted stopping means.

2. In a machine for feeding ledger sheets, a magazine for holding said sheets, means for picking the sheets out of said magazine in succession, a sheet stop, a set of feed rollers for advancing the first sheet up to the said sheet stop, means for operating said rollers, a second set of rollers directly in front of said stop, means for operating said second set of rollers, means for separating said second set of rollers to release said sheet when it is against said stop, a sheet aligner cooperating with one side of said sheet to push it into alignment while it is at said stop, means for operating said aligner when said sheet is out of the grasp of said first set of feed rollers, and a common operating means for removing said sheet stop and engaging said second set of feed rollers to advance the aligned sheet.

FRED M. CARROLL.
JOHN H. BAKELAAR.
WILLIAM B. POND.

REFERENCES CITED

The following references are of record in the file of this patent:

UNITED STATES PATENTS

| Number | Name | Date |
|---|---|---|
| 214,797 | Weir | Apr. 29, 1879 |
| 434,643 | Naylor | Aug. 19, 1890 |
| 1,581,431 | English | Apr. 20, 1926 |
| 1,807,309 | Elliott | May 26, 1931 |
| 1,827,259 | Pierce | Oct. 13, 1931 |
| 1,891,899 | Bushnell | Dec. 27, 1932 |
| 1,976,582 | Schultz | Oct. 9, 1934 |
| 1,986,620 | Borden et al. | Jan. 1, 1935 |
| 2,130,897 | Ogden | Sept. 20, 1938 |
| 2,184,296 | Goebel et al. | Dec. 26, 1939 |
| 2,284,430 | Jirousek | May 26, 1942 |
| 2,358,560 | Curtis | Sept. 19, 1944 |
| 2,428,769 | Bobst | Oct. 14, 1947 |